ELECTRIC WAVE FILTERS EMPLOYING WAVEGUIDES

Filed Sept. 1, 1954

Inventors
L. LEWIN-
J. B. SETCHFIELD
By Philip M. Bolton
Attorney

United States Patent Office 2,858,513

Patented Oct. 28, 1958

2,858,513

ELECTRIC WAVE FILTERS EMPLOYING WAVEGUIDES

Leonard Lewin and John Bernard Setchfield, London, England, assignors to International Standard Electric Corporation, New York, N. Y.

Application September 1, 1954, Serial No. 453,508

Claims priority, application Great Britain September 10, 1953

11 Claims. (Cl. 333—73)

The present invention relates to impedance units for electric waveguide filters.

The invention concerns what are known as "reflection filters," that is, filters intended to reflect substantially without loss electric waves covering a given band of frequencies, and to be substantially transparent to waves of other frequencies. Such filters could also be regarded as band stop filters.

One important application of reflection filters is to channel separation (including channel dropping and insertion) in super-high frequency radio communication systems where several high frequency channels employing different carrier frequencies are operated over the same route, and employ the same antennas at the various stations of the system.

The requirements for reflection filters for such a system are very stringent, and considerable difficulty has hitherto been experienced in designing filters which meet these requirements. One important point is that the response of the filter over the reflection band should be symmetrical with respect to the mid-band frequency. It has already been proposed to provide a reflection filter consisting of a section of rectangular waveguide with a number of equally spaced impedance units each consisting of a series resonant element arranged perpendicularly to the electric lines of force of the field in the guide, and coupled to the field by a capacity element. This type of reflection filter is illustrated, for example, in the article entitled "Microwave Repeater Research" by H. T. Friis in the Bell System Technical Journal, April 1948, page 215, Fig. IV–6.

This type of filter, however, produces an unsymmetrical response characteristic, and the principal object of the present invention is to remove this objection, and is achieved by providing an impedance unit for the filter in which the series resonant element is inductively coupled to the field in the waveguide, in addition to being capacitatively coupled, as already proposed.

The invention also provides a reflection filter employing impedance units of the last mentioned type.

The invention will be described with reference to the accompanying drawings, in which.

Figure 1:
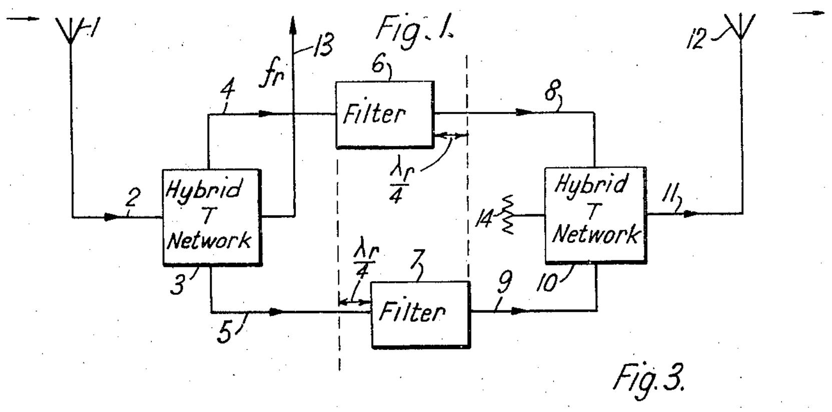
Fig. 1 shows a block schematic circuit diagram of an arrangement for dropping a channel in a multichannel high frequency radio communication system, to illustrate the use of a reflection filter.

Referring first to Fig. 1, incoming waves comprising any number of modulated super-high carrier frequency waves of frequencies $f_1$, $f_2$, $f_2$ . . . $f_n$ are received by an antenna 1 and transmitted through a waveguide circuit 2 to a hybrid T-network 3, the side arms of which are connected by waveguides 4, 5 respectively to two identical reflection filters 6, 7 and thence by waveguides 8, 9 to the side arms of a second hybrid T-network 10, the output of which is connected over a waveguide 11 to a transmitting antenna 12.

The fourth outlet of the network 3 is connected by a waveguide 13 to apparatus (not shown) in which the selected channel waves are dealt with, and the fourth outlet of network 4 is terminated by a dummy load impedance 14.

If it be desired to select the channel having the carrier frequency $fr$, then each of the filters 6, 7 will be designed to reflect a band of frequencies centred on $fr$. Further, the lengths of the waveguides 4 and 5 should be so adjusted that the distances measured along the waveguide from the inputs of the filters 6 and 7 to the centre junction of the hybrid T-network 3 differ by $(2k-1)\lambda r/4$, where $\lambda r$ is the guide wavelength of waves of frequency $fr$, and $k$ is a positive integer. Preferably $k=1$, so that the difference of the distances from the filters 6 and 7 to the network 3 is equal to $\lambda r/4$. Preferably also the same relation should hold for the distances between the filters 6 and 7 and the network 10.

This arrangement is illustrated in Fig. IV–4 on page 214 of the Bell System Technical Journal referred to above.

In this circuit, the modulated carrier waves of frequency $fr$ will be delivered to the waveguide 13, while all the others will be delivered to the antenna 12.

Figure 2:
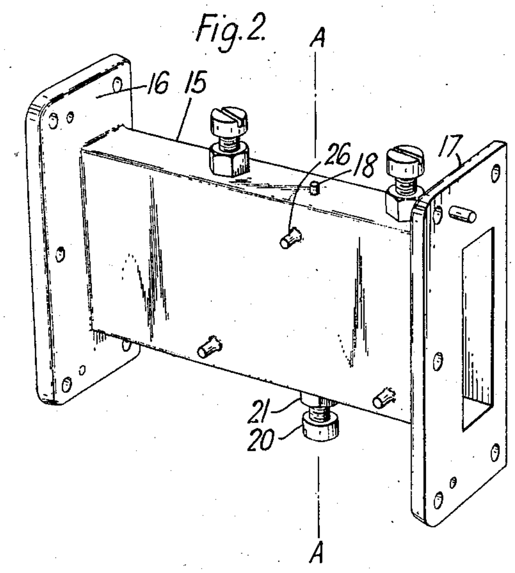
Fig. 2 shows a perspective view of a reflection filter according to the invention.
Figure 3:
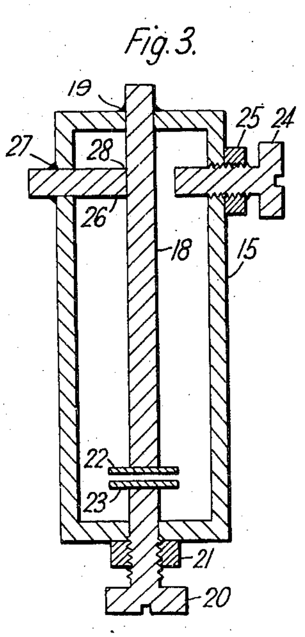
Fig. 3 shows details of an impedance element for a reflection filter according to the invention.

Fig. 2 shows a perspective view of a reflection filter according to the invention, which may be used with advantage for each of the filters 6, 7 of Fig. 1; and Fig. 3 shows a sectional view through the line A—A of Fig. 2, the section being perpendicular to the axis of the waveguide. The filter comprises a length 15 (Fig. 2) of rectangular waveguide having at the ends the usual flanges 16, 17 by means of which it may be connected to other waveguides (not shown). At each of three positions inside the guide there is located a similar group of elements forming an impedance unit, details of which are shown in Fig. 3. For a reason to be explained later, the centre impedance unit is arranged inverted with respect to the others.

Referring to Fig. 3, a metal rod 18 is inserted through a hole in one of the narrow walls of the guide and is arranged centrally and parallel to the wide walls, and normal to the axis of the guide. The rod should be a good fit in the hole and should be fixed with solder on the outside of the guide at 19. Through the other narrow wall, and opposite the end of the rod 18, is inserted an adjustable screw plug 20 which may be fixed in position by a lock-nut 21. Preferably metal discs 22, 23 are fixed on the ends of the rod 18 and of the screw 20, though these discs are not essential.

A second adjustable screw 24 is inserted through one of the wide walls of the guide near the upper end, as shown, so that the end of the screw will be opposite the side of the rod 18. A lock-nut 25 is provided for fixing the screw 24 after adjustment.

The arrangement described so far is similar to that disclosed in Fig. IV–6 of the article referred to above, and as already explained produces a filter with an unsymmetrical response characteristic. According to the invention, therefore, a second metal rod 26 is inserted through a hole in the other wide wall of the guide opposite the end of the screw 24, and is pushed through into contact with the rod 18. It should be a good fit in the hole, and should be fixed by soldering on the outside of the guide at 27. It should also be soldered at 28 to the rod 18, taking care that no unnecessary excess solder is left on the surfaces of the rods.

The elements of Fig. 3 which can be seen in Fig. 2 are designated by the same numerals. The screw 24 and lock-nut 25 are hidden at the back of the guide, but the outer ends of the rods 18 and 26 are visible, and also the screw 20 and lock-nut 21.

The inductive rod 18 and the capacity between the plates 22, 23 form a series resonant circuit which, however, is perpendicular to the lines of electric force in the field of the guide, and therefore in the absence of the rod 26 and screw 24 would be uncoupled to the field and would therefore have substantially no effect. If the screw 24 alone is provided, according to the arrangement already proposed, a small capacity is produced between the end of the screw and the rod by means of which capacity the resonant circuit is coupled to the field. If the resonant circuit is tuned to the centre-frequency *fr* of the desired reflection band, then the guide is practically short circuited at this frequency and the waves will be substantially totally reflected. At some frequency above *fr*, the capacity provided by the screw 24 produces a parallel resonance at which substantially no reflection takes place; however there is no corresponding parallel resonance at frequencies below *fr*, and so the reflection response curve of the impedance unit is unsymmetrical. On the other hand, if the rod 26 is provided alone instead of the screw 24, it will be found that a single parallel resonance occurs at some frequency below *fr*. It follows that if, according to the invention, both elements 24 and 26 are provided, a parallel resonance will be produced on each side of the frequency *fr*, and by suitable adjustment of the screw 24, the response curve of the impedance unit may be made substantially symmetrical.

As symmetry is approached, the parallel resonance effect disappears, and at the symmetrical position the response becomes very close to the desired form of that of a simple series tuned circuit.

It should be noted that it is not essential that the capacity between the screw 24 and the rod 18 should be adjustable. It is possible to determine the required capacity value by measurement on a prototype sample, and then the screw 24 can be replaced in manufactured models by an equivalent fixed rod (not shown) secured similarly to the rod 26.

The filter shown in Fig. 2 is made up of three impedance units as shown in Fig. 3 with their centre planes spaced apart by a distance of $\lambda r/4$ where $\lambda r$ is the guide wavelength corresponding to the centre frequency *fr* of the reflection band.

Two desirable precautions may be mentioned at this point. First, in order to reduce the attenuation of the filter, assuming that the waveguide is made of brass, as usual, the surfaces of the elements of the impedance units and the inside surfaces of the guide should preferably be silver plated. Second, in order to reduce losses, the threads of those portions of the screws 20, 24 which project inside the guide should preferably be removed in order to produce a smooth cylindrical surface.

The process of designing and adjusting the impedance unit shown in Fig. 3 will now be explained.

The complete filter is required to have a reflection characteristic which is "maximally flat" in the reflection band, and also to be substantially transparent outside the reflection band. The meaning of "maximally flat" is explained in the article entitled "Maximally Flat Filters in Waveguide" by W. W. Mumford in the Bell System Technical Journal, October 1948, page 684, but it must be remembered that Mumford is considering the usual band-pass filters. Similar treatment may however be applied to reflection filters by using the corresponding inverse networks in all cases.

The two requirements stated above generally result in different choices for the values of the filter elements, but it happens that the choices are the same in the particular case of a filter with three impedance units, and so that number is preferred for the filter according to the present invention.

The design of the maximally flat reflection filter can be derived from Mumford's treatment of the maximally flat band pass filter by replacing each filter arm by its inverse. Thus, referring to Fig. 3 of Mumford's article, the equivalent ladder circuit for the reflection filter consists of parallel-resonant series arms and series-resonant shunt arms, all tuned to the mean frequency *fr* of the reflection band. The selectivity of the resulting filter then depends on the selectivities of the individual resonant arms.

The selectivity Q is defined in the following way. The filter is supposed to be connected between a wave source and a load each of impedance R. Then Q is defined as equal to $fr/(f_2-f_1)$ where $f_2$ and $f_1$ are the two frequencies (one on either side of *fr*) at which half the incident power is reflected. The same definition is used for any individual filter arm, which will be supposed connected by itself between the same source and the same load. It follows that the impedance $Zm$ at any frequency $f$ of the $m$th filter arm will be equal to $$R[1+2jQ_m(f/fr-fr/f)]$$

where $Qm$ is the selectivity of the $m$th filter arm.

It follows from Mumford's treatment that in order to produce a maximally flat reflection filter with $n$ arms, the selectivity of the $m$th filter arm should be given by $$Q_m=Q \operatorname{cosec} (2m-1)\pi/2n$$

where Q is the selectivity desired for the complete filter.

However, in order to meet the condition that the filter shall be substantially transparent outside the reflection band, it can be shown that the best condition is that the selectivities of the arms follow an inverse binomial distribution; thus $$Q_m=2Q^n/C_m$$

The two formulae for $Q_m$ will be seen to be the same for $n=3$, as already stated, in which case $Q_1=Q_3=2Q$ and $Q_2=Q$.

When applying the 3-arm ladder structure to the waveguide filter, the central (shunt) arm consists of a series-resonant impedance produced by the impedance unit shown in Fig. 3, and having a selectivity equal to Q. The other two arms are series arms consisting of parallel-resonant circuits with a selectivity of $2Q$. These two arms are effectively produced by means of two other impedance units as shown in Fig. 3 having a selectivity $2Q$, and placed at a distance of $\lambda r/4$ from the central impedance unit and therefore, owing to the impedance inverting property of quarter-wave lines, they appear from the central impedance unit as series arms each consisting of a parallel-resonant impedance.

Referring to Fig. 3, the series resonance of the impedance unit may be tuned to the frequency *fr* by adjusting the screw 20. The Q valve depends on the distance between the elements 24 and 26 and the adjacent narrow wall of the guide, and this dimension is the principal difference between the central element assembly of the filter and the two outer ones.

While it is possible to tune the impedance unit over a range of frequencies, it will be found that for a given position of the elements 24 and 26, the Q value depends on the resonance frequency. Accordingly each filter should preferably be designed for a particular resonance frequency.

The procedure will be somewhat as follows. The mid-band reflection frequency and the corresponding Q value for the complete filter will be specified. From this, the Q value required for each impedance unit is determined as explained above. The corresponding spacing between the elements 24 and 26 and the adjacent narrow wall of the guide is then determined from a series of preliminary experiments, and the assembly is made up in accordance with this determination. It is then necessary to adjust the screw 20 to tune the element assembly to the mid-band frequency, and also to adjust the screw 24 so that a symmetrical reflection response characteristic is obtained. These two adjustments are not independent of one another, and so after each change in the adjustment of the screw 24 the assembly must be re-tuned by adjustment of the screw 20. If the screw 24 is replaced by a fixed rod, as already mentioned above, the corresponding adjustment of course does not have to be made, and it is only necessary to adjust the screw 20 for tuning. In order to assist in making these adjustments any suitable conventional apparatus for measuring the reflection coefficient or standing wave ratio may be employed.

In practice it may be found that the adjustment of the screw 20 is rather critical, because the gap between the ends of the screw 20 and of the rod 18 is often very small. For that reason it is desirable to provide the discs 22 and 23 by means of which the same tuning capacity is obtained with a larger gap, and the adjustment then becomes less critical. However, these discs must not be too large otherwise they may produce appreciable undesired reflections. It may also be difficult or impracticable to fix the disc 23 on the end of the screw 20, unless the guide is made from two similar channel portions which are afterwards secured together. Some advantage will however be obtained by providing only the disc 22.

After the adjustment of the screw 20 or 24 has been made, the tightening of the corresponding locknut 21 or 25 may be found to change the adjustment slightly. The effect of tightening is generally to withdraw the screw very slightly, and accordingly the difficulty can usually be overcome by setting the screw very slightly too far in, and then tightening the locknut until the proper adjustment is just reached.

It has been found that the Q value of the impedance unit shown in Fig. 3 is approximately inversely proportional to the distances between the axis of the rod 26 and the adjacent narrow wall of the guide. Also, the coupling capacity (produced by the screw 24) necessary for obtaining a symmetrical response characteristic increases with increase of the Q value.

It may be added that the rod 26 may be replaced by a diaphragm plate (not shown) which extends from the adjacent narrow wall as far as the axis of the rod 26, and substantially the same results are obtained.

The three impedance units according to Fig. 3 necessary for making up the whole filter could be constructed in separate short lengths of the guide intended to be bolted together to form the complete filter, but the adjustments are liable to be upset by the strains produced by coupling the sections together, and moreover, in spite of the fact that the three impedance units are spaced a quarter wavelength apart, there is liable to be slight mutual coupling between them. This coupling is reduced by inverting the central assembly with respect to the others, but the coupling which remains may slightly upset the adjustments already made, and so it will be preferable to provide the three impedance units in a single length of guide as shown in Fig. 2, and to adjust each of them in the presence of the others.

It may be added that the impedance elements could be spaced apart by three, or other odd number of quarter wavelengths in order to reduce the coupling, but the response characteristic might then not be so good.

Figure 4:
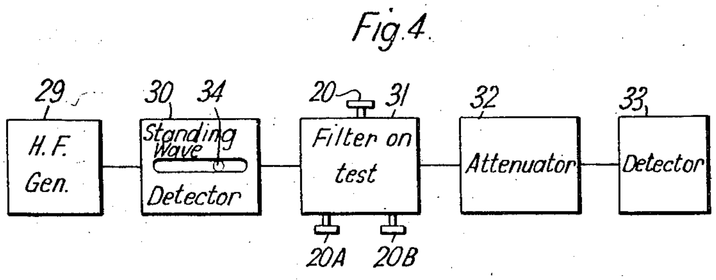
Fig. 4 shows a block schematic circuit diagram of a testing arrangement used for adjusting reflection filters according to the invention.

The adjustment of the three impedance units may be accomplished for example, with the test arrangements shown in Fig. 4. A high frequency generator 29 is connected through a standing wave detector 30 to the filter 31 which is to be adjusted. The output of the filter is connected through an attenuator 32 to a wave detector 33. The three tuning screws 20, 20A and 20B are first screwed out so that all the element assemblies are well out of tune, and the generator 29 is set to the mid-band frequency for which the filter is designed. The tuning screw 20B nearest to the attenuator 32 is first adjusted for a minimum reading in the detector 33. The probe 34 of the standing wave detector 30 is then set at a node, and the tuning screw 20 is then adjusted until the node as determined by the probe 34 has shifted exactly one quarter of a wavelength towards the generator 29. This means that substantially total reflection is now occurring at the central element assembly, which must accordingly be tuned to the mid-band frequency. Finally the screw 20A is adjusted until the node has shifted a further exact quarter wavelength towards the generator 29.

The value to be chosen for the diameter of the rod 18 of Fig. 3 is not very critical, but it should not be too large, otherwise it will produce an unwanted reflection on account of its width dimension which is parallel to the electric field. In a practical case of a filter employing a rectangular waveguide with internal dimensions 2 inches by ⅔ inch, a rod ⅛ inch in diameter gave satisfactory results at 4,000 megacycles per second, but a larger or smaller rod could have been used. It has also been found that the best results are obtained when the rod 18 is as long as possible. The maximum length will however be limited in practice by tuning difficulties, and a length of 1¾ inches will be found to be about the best value for a waveguide 2 inches wide.

In the case where the rod 18 is ⅛ inch in diameter the rod 26 should preferably be the same, and the screws 20 and 24 can conveniently be No. 0–B. A. screws.

In an actual practical case with the above-stated dimensions, a reflection filter was made up for a mid-band frequency of 4,010 megacycles per second and with a Q-value of 50. In accordance with the requirements stated above, the three impedance units were spaced apart by a quarter wavelength, and the Q value was 50 for the central impedance unit, and 100 for the other two, all units being of course tuned to 4,010 megacycles in the manner explained. The inside surface of the waveguide and the surfaces of the elements of the impedance units were silver plated with a matt finish. It was found that the reflection response curve of the filter was substantially symmetrical, and that the reflection at 4,010 megacycles was about 96.5%. The reflection at frequencies well outside the reflection band was not more than about 1%.

While the principles of the invention have been described above in connection with specific embodiments, and particular modifications thereof, it is to be clearly understood that this description is made only by way of example and not as a limitation on the scope of the invention.

What we claim is:

1. An impedance unit for a hollow metallic electric waveguide of rectangular cross-section comprising a series resonant element connecting a point of one narrow guide wall to the corresponding opposite point of the other narrow guide wall, means for capacitatively coupling the series resonant element to one wide wall of the guide, and an inductance connecting said resonant element to the other wide wall of the guide for providing the impedance unit with a symmetrical response curve about the centre-frequency of a desired reflection band.

2. An impedance unit for a hollow metallic electric waveguide of rectangular cross-section comprising a straight inductive rod connected to one of the narrow walls of the guide and extending partly across the guide parallel to the wide walls and normal to the axis of the guide, a capacity element coupling the free end of the rod to the other narrow wall of the guide, means for capacitatively coupling a point in the rod to one of the wide walls of the guide and in inductance connecting said point in the rod to the other wide wall for providing a parallel resonance with said capacitive coupling means about the centre-frequency of a desired reflection band.

3. An impedance unit for a hollow metallic electric waveguide of rectangular cross-section comprising a first straight inductive rod extending centrally and partly across the guide parallel to the wide walls and normal to the axis of the guide, the rod being directly connected to one narrow wall and being connected by a first condenser to the other narrow wall, a second straight inductive rod connecting a point in the first rod to one of the wide walls of the guide, and a second condenser connecting the said point to the other wide wall of the guide.

4. An impedance unit according to claim 3 in which the first condenser is adjustable.

5. An impedance unit according to claim 3 in which the first condenser is formed by a first adjustable screw extending through the said other narrow wall with its tip opposite the end of the first rod.

6. An impedance unit according to claim 4 in which a flat metal disc is provided on the tip of the screw and on the end of the said first rod.

7. An impedance unit according to claim 3, in which the second condenser is formed by a second adjustable screw extending through the said other wide wall of the guide with its tip opposite the said point on the first inductive rod.

8. An impedance unit according to claim 3 in which the first condenser is adjusted in such manner that the impedance unit produces maximum reflection of waves of a given frequency transmitted through the guide, and in which the capacity of the second condenser is chosen or adjusted in such manner that the reflection-frequency response characteristic is substantially symmetrical with respect to the given frequency.

9. An electric waveguide reflection filter comprising a length of hollow waveguide of rectangular cross-section and a plurality of impedance units according to claim 8 all adjusted for maximum reflection at the same given frequency, adjacent units being spaced apart by a quarter of the wavelength in the guide of waves of the given frequency.

10. A filter according to claim 9 in which the assembly of the elements of alternate impedance units is inverted with respect to the assembly of the elements of the other impedance units in order to reduce mutual coupling between adjacent impedance units.

11. A filter according to claim 9 having three impedance units so designed that the Q value of the central impedance unit is half the Q value of the other two impedance units.

References Cited in the file of this patent

UNITED STATES PATENTS

| | | |
|---|---|---|
| 2,422,058 | Whinnery | June 10, 1947 |
| 2,510,288 | Lewis | June 6, 1950 |
| 2,530,679 | Brill | Nov. 21, 1950 |
| 2,708,236 | Pierce | May 10, 1955 |
| 2,744,242 | Cohn | May 1, 1956 |

FOREIGN PATENTS

| | | |
|---|---|---|
| 504,642 | Belgium | July 31, 1951 |